United States Patent [19]

Marietta

[11] Patent Number: 4,964,433
[45] Date of Patent: Oct. 23, 1990

[54] ROTARY VALVE

[75] Inventor: Walter E. Marietta, Racine, Wis.

[73] Assignee: Sta-Rite Industries, Inc., Milwaukee, Wis.

[21] Appl. No.: 480,085

[22] Filed: Feb. 14, 1990

[51] Int. Cl.$^5$ ..................... F15B 13/04; F16K 11/072
[52] U.S. Cl. .................. 137/115; 137/625.21; 137/596.12
[58] Field of Search ...................... 137/625.21, 625.22, 137/625.23, 625.24, 117, 115, 596.12

[56] References Cited

U.S. PATENT DOCUMENTS

| | | | |
|---|---|---|---|
| Re. 30,517 | 2/1981 | McClocklin | 137/625.21 |
| B 514,687 | 1/1976 | Janvrin | 137/596.12 |
| 2,845,941 | 8/1958 | Wagner | 137/246.12 |
| 2,990,853 | 7/1961 | Sharp | 137/625.42 |
| 3,464,444 | 10/1967 | Tennis | 137/596.12 |
| 3,584,048 | 6/1971 | Lubos | 137/625.21 |
| 3,595,274 | 7/1971 | Faisandier | 137/625.21 X |
| 3,677,295 | 7/1972 | Schultz | 137/596.12 |
| 3,796,232 | 3/1974 | Dalton | 137/625.21 |
| 3,850,201 | 11/1974 | Eickman | 137/625.21 |
| 3,892,259 | 7/1975 | McClocklin | 137/625.21 |
| 3,910,311 | 10/1975 | Wilke | 137/596 |
| 3,930,520 | 1/1976 | Whitaker | 137/625.21 |
| 4,049,019 | 9/1977 | McClocklin | 137/625.21 |
| 4,259,986 | 4/1981 | Maucher et al. | 137/596.12 |
| 4,281,684 | 8/1981 | Broeg | 137/625.21 |
| 4,330,008 | 5/1982 | Skelly | 137/596.13 |
| 4,595,034 | 6/1986 | Hutson | 137/625.21 |
| 4,655,250 | 4/1987 | Jackson | 137/596.13 |

*Primary Examiner*—Alan Cohan
*Attorney, Agent, or Firm*—Law Firm of Peter N. Jansson, Ltd.

[57] ABSTRACT

The improved rotary valve includes a body and a valving block having a valve interface with at least two work ports. A rotatable valve plate is received in the body and has a working face with a land which is in sliding contact with the valve interface. A rotatable stem is received in the valve body and is coupled to the valve plate for causing rotational movement of the plate. The stem has an axial passage in fluid communication with the pressure region of the valve and has at least one metering orifice for intersecting the inlet conductor of the valve and controllably flowing fluid into the pressure region. In one embodiment, used with open center systems, each of the work ports is in fluid communication with the pressure region and the discharge region when the valve plate is in the neutral position. The valve plate and stem are rotatable to an operating position wherein one of the work ports is in fluid communication with only the pressure region and the work port is in fluid communication with only the discharge region. A flow controlling mechanism functions over a range of operating positions to control the flow of fluid from the inlet conductor to a work port. Because of the flow controlling mechanism, the valve has a load sensing capability. An integral relief valve prevents overpressure and provides a path for disabling the rotary valve by use of a solenoid valve without disturbing the position of the valve handle.

16 Claims, 7 Drawing Sheets

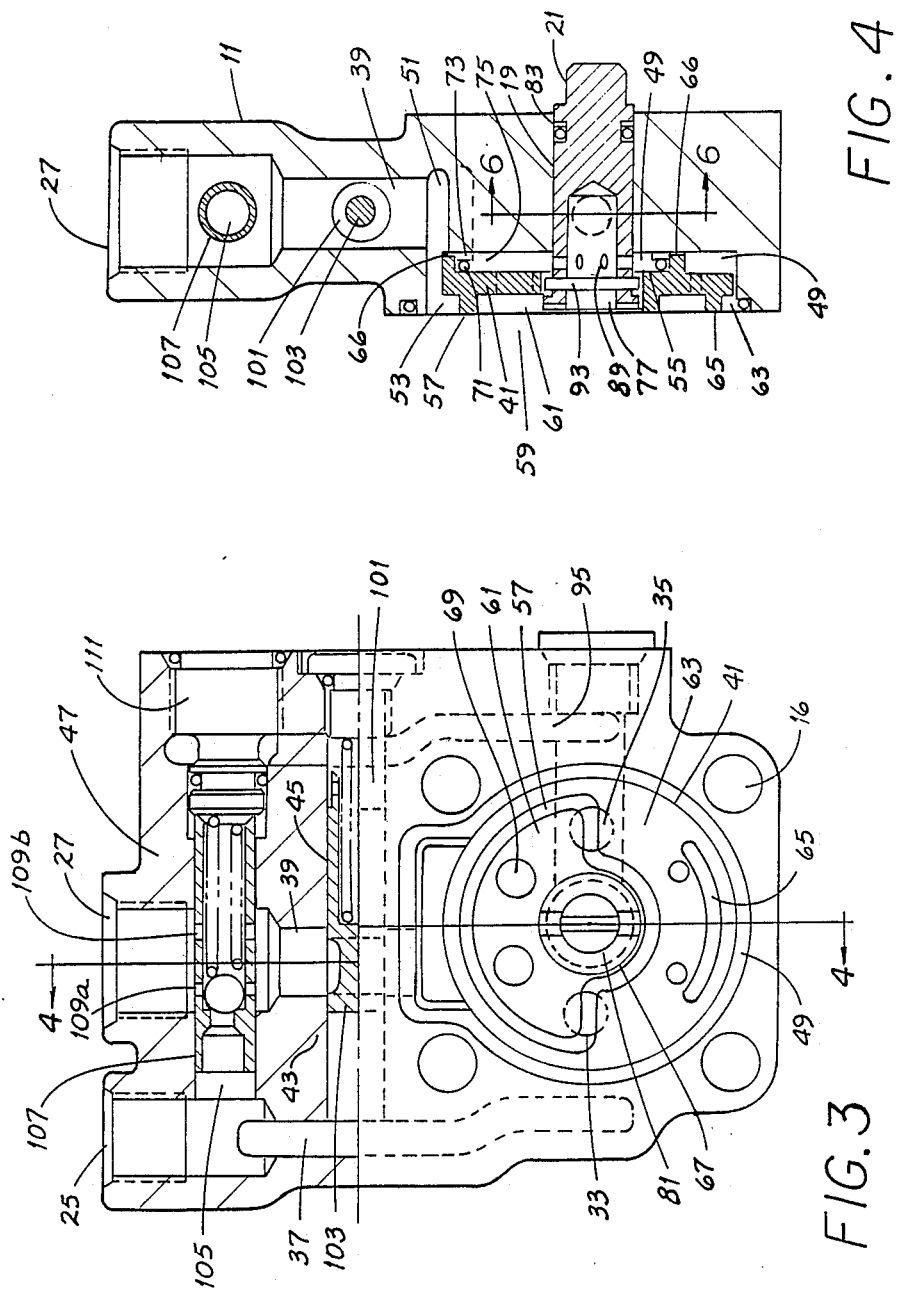

ROTARY VALVE

FIELD OF THE INVENTION

This invention is related generally to hydraulic valves and, more particularly, to hydraulic valves of the rotary type for controllably flowing fluid between a source and a hydraulic device such as a motor or cylinder.

BACKGROUND OF THE INVENTION

Hydraulic valves are frequently used for controlling the speed and direction of operation of a hydraulic device attached thereto. Such valves include those of the spool and sliding plate type, both of which are usually operated using linear motion. Other types of such valves use rotary motion either directly or by translating linear motion into rotary motion. Examples of such valves of the latter type are shown in U.S. Pat. Nos. 4,595,034; 3,910,311 and 4,281,684. All of the foregoing typically meter fluid to the hydraulic device solely by the gradual intersection of two ports or passages and are devoid of any load sensing capability.

In general, valves of the spool and slide plate type achieve balance of the valving member by closely controlling the dimensions of the valving member and of the cavity in which it moves. Fluid at a substantially uniform pressure is permitted to surround the valving element and results in what might be called a natural balancing arrangement. Valves which use a rotary principal of operation either achieve balancing in a similar fashion as described above (see U.S. Pat. No. 4,281,684, for example) or, in the alternative, employ no special structure to achieve balancing. Instead, the rotary valving plate is held in position mechanically rather than with hydraulic pressure An example of such a valve is shown in U.S. Pat. No. 4,595,034.

Known rotary valves of the foregoing type lack what is known as a "meter in" capability. That is, they include no provision for metering fluid into the valve structure prior to the introduction of such fluid to the valving face and the working ports of the device being controlled. In addition, designers of such earlier valves have failed to appreciate the way in which a separate flow sensor may be integrated into and used with a rotary valve to permit incoming hydraulic fluid to partially or substantially entirely bypass the valving portion of the device and be routed to tank at the line side.

Another factor to be addressed by a valve designer is that of "packaging" of auxiliary hydraulic circuit components into a directional valve including such a valve of the rotary type. Such components include relief valves and flow control valves, to name but a few. While the packaged integration of these components into a directional valve tends to make the latter more expensive to purchase, this cost is more than offset by the ease of installation of the valve into the overall hydraulic circuit. That is, the installer need not separately purchase, mount and attach piping and hoses to such auxiliary valves. U.S. Pat. No. 4,595,034 shows one approach to packaging such auxiliary valves. The apparatus shown therein includes a built-in relief valve connected on the load side of the valve rather than on the incoming or line side thereof.

In addition, applications are encountered where it is highly desirable to retain the rotated position of the valve while yet causing hydraulic fluid to bypass the internal valving surfaces and instead, be routed to the discharge port. Such a feature permits the controlled device, a motor for example, to be temporarily stopped without the necessity of manipulating and later resetting the position of the valving surfaces.

A rotary hydraulic valve which uses a face plate with a controlled degree of imbalance, which uses an axially arranged infeed circuit having a "meter in" capability, which provides both direction and speed control with rotational movement and which integrates auxiliary valving to perform specialty control functions would be an important advance in the art.

OBJECTS OF THE INVENTION

It is an object of this invention to overcome some of the problems and shortcomings of the prior art.

Another object of this invention is to provide a rotary valve having a face plate which is slightly, hydraulically unbalanced for maintaining the face plate in contact with a valve interface.

Still another object of the invention is to provide a rotary valve wherein the valve plate is slightly unbalanced by applying the same pressure to both sides of the plate, one side of which has a slightly greater effective area than the other.

Another object of this invention is to provide a rotary valve which incorporates a flow controlling mechanism for limiting, over a range of operating positions, the flow of fluid from an inlet conductor to a work port of an attached hydraulic device.

Yet another object of the invention is to provide an improved rotary valve which has an integrated relief valve operative on the input or line side of the valve.

Another object of the invention is to provide an improved rotary valve which optionally may include a selector valve for controllably permitting fluid to flow at low pressure to a discharge conductor when the selector valve is in a particular position.

Another object of the invention is to provide an improved rotary valve which exhibits load sensing control characteristics.

Still another object of the invention is to provide an improved rotary valve which, in somewhat differing embodiments, may be used with an open center or with a closed center hydraulic system.

These and other important objects will be apparent from the descriptions of this invention which follow.

SUMMARY OF THE INVENTION

The improved rotary valve includes a valving block having a valve interface with at least two work ports formed in the interface for flowing fluid between the valve and the block. The valve body is attached to the block and has an inlet conductor and a discharge conductor.

A rotatable valve plate is received in the body and has a working face and an opposed face. The working face includes a land which is in sliding contact with the valve interface and which is configured to segregate the cavity between the valve interface and the working face into a pressure region and a discharge region.

A rotatable stem is received in the valve body and is coupled to the valve plate for causing rotational movement of the plate. The stem has an axial passage in fluid communication with the pressure region and has at least one metering orifice for intersecting the inlet conductor and controllably flowing fluid into the pressure region. In one embodiment, used with open center systems, each of the work ports is in fluid communication with the pressure region and the discharge region when the valve plate is in the neutral position The valve plate and stem are rotatable to an operating position wherein one of the work ports is in fluid communication with only the pressure region and the other work port is in fluid communication with only the discharge region.

A flow controlling mechanism functions over a range of operating positions to control the flow of fluid from the inlet conductor to a work port.

More particularly, the valving block may be a constituent of the rotary valve itself. However, the configuration of the valve lends itself well to direct mounting to a controlled hydraulic device such as a hydraulic motor. When so used, it is preferred that the valving block of the motor be directly attached to the valve body of the rotary valve so that the motor and the rotary valve function as an integral unit.

The rotatable valve plate includes a continuous land formed on the working face, i.e., that face which is adjacent the valving block. This land divides the working face into a pressure region, circumscribed and confined by the land, and a discharge region which lies outside the perimeter of the land. The wall thickness and location of the land are such that when the valve plate is in the neutral position, both work ports are in fluid communication with one another and with the pressure region and the discharge region. As the valve plate is rotated from the neutral position, one of the work ports gradually comes to be in communication with only the pressure region while the other work port gradually comes to be in communication with only the discharge region. Directional control of the attached hydraulic device, the exemplary motor, is thereby achieved.

The opposed face of the valve plate also includes a continuous land which circumscribes and confines an area that is generally similar in shape to that confined by the land on the working face. However, the confined area on the opposed face is slightly larger than that of the working face. In addition, at least one hole is formed in the valve plate to communicate between the confined areas on the working face and the opposed face so that the hydraulic pressure maintained on each face is substantially equal In a highly preferred embodiment, the confined area on the opposed face is preferably selected so that the force tending to urge the valve plate toward the valving block is about 2.5% greater than the force tending to move the valve plate away from the valving block.

The valve plate is coupled to and rotated by the stem. In a highly preferred embodiment, the rotatable stem has an axial passage along a portion of its length and has as least one metering orifice which intersects with the inlet conductor and the axial passage. This orifice has a relatively small cross sectional area for initially flowing fluid from the inlet conductor to the valve plate at a low rate and for creating a back pressure. Fluid which enters this orifice is directed along the stem passage and then ported to the pressure region of the working face. Radial ports formed in the stem also port this fluid to the confined area of the opposed face. These radial ports provide a flow path which is in parallel with the path provided by the hole through the valve plate to help reduce internal pressure drop.

As the stem is progressively rotated, a second, much larger aperture gradually intersects with the inlet conductor to increase the rate at which fluid is metered into the valve. Assuming that the rotary valve and motor are fed by a pump of the fixed displacement, constant delivery type (as might be used in an open center system), the rotational position of the valve stem and the metering orifice(s) located therein controls the upstream pressure. Such control is by controlling the magnitude of the orifice cross sectional area which is permitted to be in fluid communication with the inlet conductor. This permits fluid to be metered in from the pump to the valve plate.

A discharge conductor is formed in the valve body to be in fluid communication with the downstream or discharge side of the rotary valve. In a highly preferred embodiment, the downstream side of the valve is a cavity which is bounded in part by that side of the working face lying outside the land. This cavity is denominated as the discharge region. Preferably, the rotary valve also includes a sensing conductor which, at one end, is in fluid communication with the axial passage in the rotatable stem by means of a radial opening in the stem. The sensing conductor is also connected to the inlet conductor by a lateral passage formed in the valve body.

By virtue of being connected to the axial passage in the stem, the fluid in the sensing conductor is at that pressure which prevails in the passage, i.e., that pressure which is on the downstream side of the metering orifice(s). As is described in greater detail below, this sensed pressure is applied to one side of a differential pressure valve to regulate the amount of fluid which is permitted to bypass the motor and flow directly from the inlet conductor to the discharge conductor.

In a highly preferred embodiment, a differential pressure valve is installed in that passage which connects the inlet conductor to the sensing conductor. This valve, embodied as a movable spool, is spring biased to a closed position. One end of the spool is at that pressure which prevails in the inlet conductor while the other end is at that pressure which prevails in the sensing conductor. This differential pressure valve is constructed and arranged to open slightly and permit an amount of fluid to be exhausted directly from the inlet conductor to the discharge conductor whenever the pressure drop across the differential spool reaches approximately 50–65 psi. The greater the magnitude of the pressure drop across the spool above about 50–65 psi, the greater will be the rate of flow permitted to be so exhausted. The differential valve is fully open at a pressure drop of about 75 psi.

From the foregoing, it is to be appreciated that because of the "meter in" orifice(s) formed in the rotatable stem, the pressure across the differential pressure valve can be selected by slight rotation of the stem from the neutral position This will permit fluid to be controllably bypassed around the differential spool and directly to the discharge conductor. However, as the stem is rotated farther away from neutral and toward an extreme position of travel, a stem aperture of larger area permits more fluid to flow from the inlet conductor through the stem axial passage and into the pressure region of the working face. That is, the pressure drop across the stem is reduced because the cross sectional area of the openings used to meter fluid into the valve is progressively increased. At a value of increased area, the differential spool will close.

In a highly preferred embodiment, the rotary valve also includes a relief valve arranged in the body to permit fluid to flow from the inlet conductor to the discharge conductor whenever the pressure in the inlet conductor exceeds a predetermined value. Optionally, the relief valve has a tubular body with a vent passage therethrough. A selector valve may be installed in series between the sensing conductor and the tubular body. If the selector valve is embodied as a two position solenoid valve, fluid will be permitted to flow at low pressure from the sensinq conductor through the vent passage in the tubular body and thence to the discharge conductor when the solenoid valve is open. Since one side of the differential spool is in communication with the sensing conductor, opening the solenoid valve will cause hydraulic fluid to be bypassed from the inlet conductor to the discharge conductor without passing through the main valving portion. Further details of the unique rotary valve are described below.

BRIEF DESCRIPTION OF THE DRAWINGS

FIG. 3 is an elevation view of the rotary valve taken along the section line 3—3 of FIG. 1 with parts shown in cross section, other parts shown in dotted phantom outline and with the valve plate shown in the neutral position;

FIG. 4 is a side elevation view of the rotary valve taken along the plane 4—4 of FIG. 3 with parts shown in cross section and other parts shown in dotted outline;

DETAILED DESCRIPTIONS OF PREFERRED EMBODIMENTS

Figure 1:
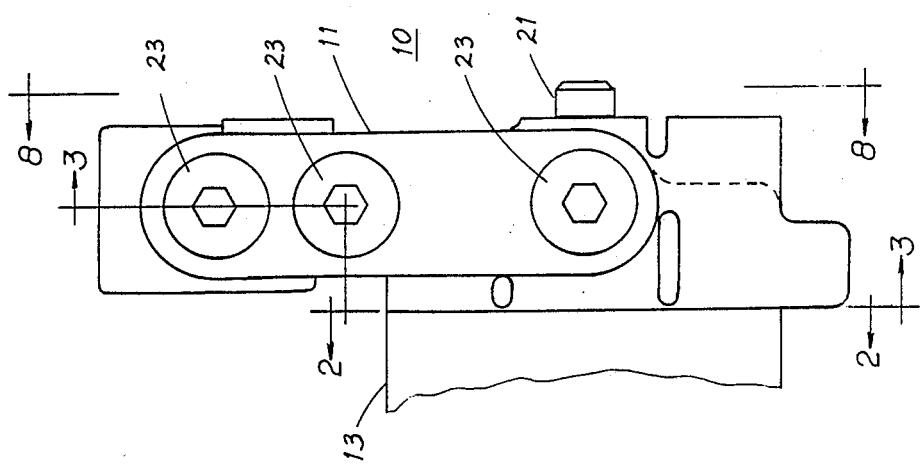
FIG. 1 is a side elevation view of the rotary valve shown with parts broken away and other parts in dotted outline.
Figure 8:
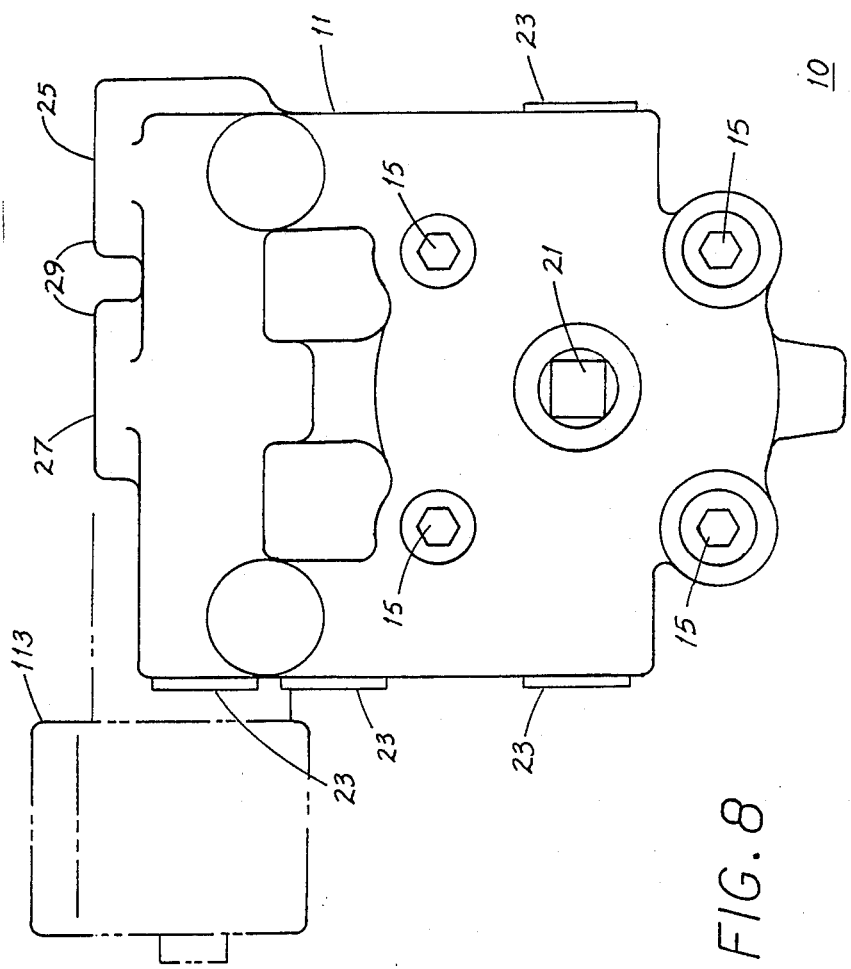
FIG. 8 is a rear elevation view of the rotary valve taken along the plane 8—8 of FIG. 1 and with part shown in phantom outline.
Figure 9:
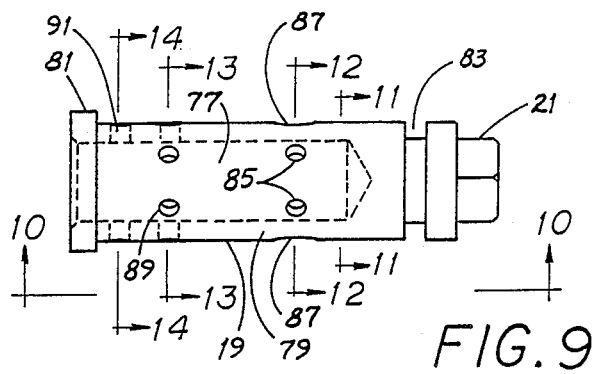
FIG. 9 is a side elevation view of the rotatable stem portion of the rotary valve, the view being taken along the same plane as that of FIG. 4.
Figure 10:
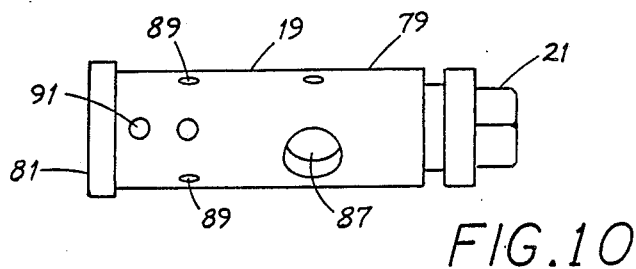
FIG. 10 is a bottom elevation view of the stem taken along the plane 10—10 of FIG. 9.
Figure 11:
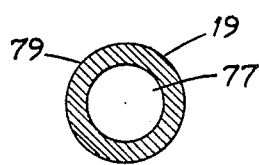
FIG. 11 is a cross sectional view of the stem shown in FIG. 9 taken along the plane 11—11 thereof.
Figure 12:
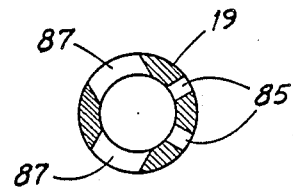
FIG. 12 is a cross sectional view of the stem shown in FIG. 9 taken along the plane 12—12 thereof.
Figure 13:
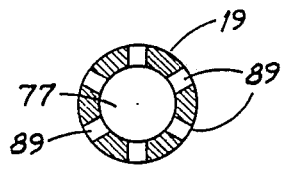
FIG. 13 is a cross sectional view of the stem shown in FIG. 9 taken along the plane 13—13 thereof.
Figure 14:
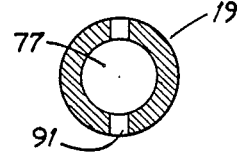
FIG. 14 is a cross sectional view of the stem shown in FIG. 9 taken along the plane 14—14 thereof.

The figures illustrate a rotary valve 10 in accordance with the invention with the overall exterior configuration of the rotary valve being shown in FIGS. 1 and 8.

The valve 10 includes a body 11 and a valving block 13 which may be a separate manifold block of a known type for connecting the valve 10 to a hydraulic device such as a motor, hydraulic cylinder or the like. In a highly preferred embodiment, the block 13 forms that end of a hydraulic motor opposite its shaft or output end. The body 11 and the block 13 are secured to one another by four bolts 15 which insert through holes 16 in the body to engage threaded holes 17 in the block 13. When constructed in that manner, the motor and rotary valve 10 can be mounted as an integral unit.

The valve 10 is operated by rotating a stem 19 which has a protruding shaft 21 preferably shaped to a torque transmitting profile such as a square. The body 11 has a number of passages formed in it and construction plugs 23 are used to close those passages after machining has been completed. An inlet port 25 and a discharge port 27 are formed in bosses 29 which protrude upward slightly from the body 11.

Figure 2:
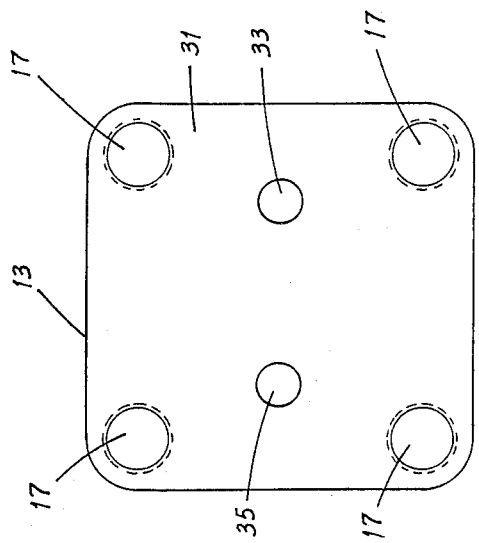
FIG. 2 is an elevation view of the valving block taken along the plane 2—2 of FIG. 1.

Referring additionally to FIG. 2, the valving block 13 has a valve interface 31 with a first work port 33 and a second work port 35 formed therein. These work ports 33, 35 permit fluid to flow between the valve body 11 and the block 13 and thence to and from the hydraulic motor. The interface 31 is preferably ground flat and smooth to provide a valving surface. The body 11 has an inlet conductor 37 which is terminated by the inlet port 25 for connection to a source of fluid such as a hydraulic pump. A discharge conductor 39 is terminated by the discharge port 27 for connection to a downstream device. Depending upon the precise configuration of the embodiment, this downstream device can be another rotary valve 10 connected in series or it can be a fluid reservoir.

In addition to the body 11, the other primary components of the valve 10 include a valve plate 41, the stem 19 coupled to the valve plate 41, a flow controlling mechanism 43 embodied as a differential pressure valve 45 and a relief valve 47. Each of these components is described in detail below. To aid understanding, the work ports 33, 35 have been superimposed in phantom on the views of FIGS. 3 and 7.

Figure 5:
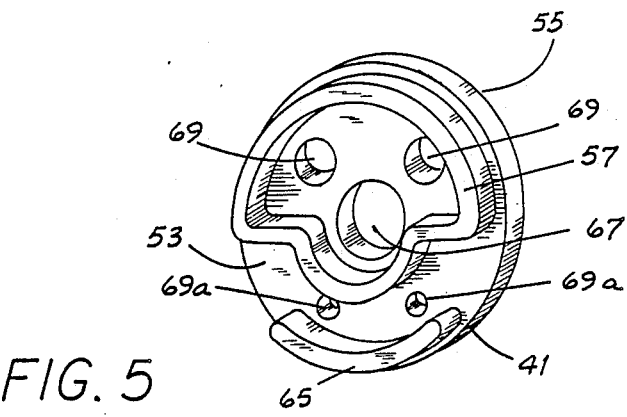
FIG. 5 is an elevation perspective view of the valve plate portion of the rotary valve as viewed toward the working face of the plate.

Referring to FIGS. 3-5, a pocket 49 is formed to a depth in the body 11 and is generally cylindrical in shape. A chamber 51 is also formed in the body 11 to a depth greater than that of the pocket 49 and is arranged at the top of the pocket 49 as a free space to permit fluid communication between the pocket 49 and the discharge conductor 39.

The rotatable valve plate 41 is received in the pocket 49 and has a working face 53 for performing directional valving functions and an opposed face 55 for providing a slight pressure unbalance. The working face 53 includes a continuous land 57 which is in sliding, rotational contact with the valve interface 31 and which is configured to segregate the cavity 59 adjacent the working face 53 into a pressure region 61 and a discharge region 63. That is, the pressure region 61 is that area which is confined within the perimeter of the land 57 while the discharge region 63 is that area outside the land 57.

That side of the valve plate 41 away from the viewer of FIG. 5 also includes a continuous land 66 which is similar in shape and thickness to the land 57. For reasons relating to the need to provide a slight pressure unbalance of the valve plate 41, the balance area confined by the land on the opposed face is somewhat greater than that confined by the land 57 on the working face 53.

The valve plate 41 includes a hole 67 for receiving the stem 19 to be coupled to the plate 41 and at least one, and preferably two, holes 69 for communicating the hydraulic pressure in the pressure region 61 to the balance area on the opposed face 55 which is confined by the opposed land. At least one and preferably two additional holes 69a are formed in the valve plate 41 to be in communication with the discharge region 63 and therefore with the discharge conductor 39.

As best seen in FIG. 4, a molded resilient seal 71 is placed inside the balance area to be in substantially continuous contact with the land 66. A molded back-up ring 73, preferably of Teflon ® material, is placed atop the resilient seal 71 and bears against the floor of the pocket 49 as the valve plate 41 is rotated. In that way, pressure in the pressure region 61 which is communicated to the balance area 75 on the opposed face by the hole(s) 69 is confined in that balance area 75.

From the foregoing explanation, it will be understood that the pressure in the pressure region 61 and in the balance area 75 will be generally equal to one another at all times. It will also be appreciated that any pressure within the axial passage 77 of the stem 19 (described in detail below) will be in such a direction as to urge the stem 19 to the right as viewed in FIG. 4. Because of that balance area 75 is selected to be slightly greater than the effective area of the valve stem 19 and the pressure region 61 by about 2.5%. In that way, the valve plate 41 will be urged toward the valve interface 31 with a force sufficient to provide a satisfactory seal between the land 57 and the interface 31 but not so great as to cause galling, seizing or undue wear.

Figure 7:
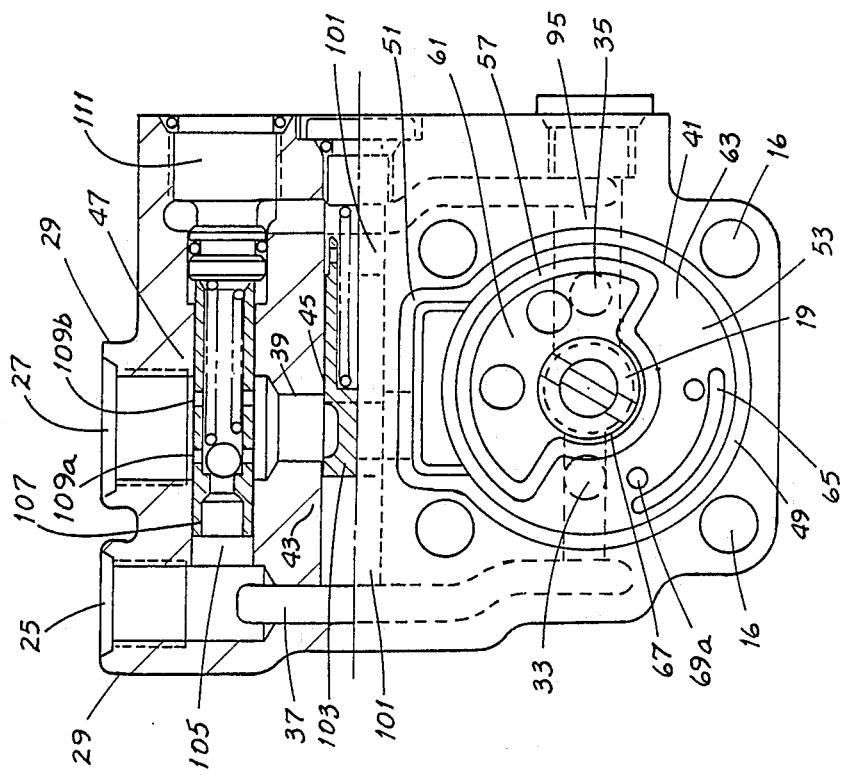
FIG. 7 is an elevation view similar to that of FIG. 3 except with the valve plate shown in a rotated position for directional control.

As best seen in FIG. 3, the configuration of the land 57 and its bisecting location with respect to the work ports 33, 35 causes both ports 33, 35 to be in fluid communication with the pressure region 61 and the discharge region 63 when the valve plate 41 is in the neutral position. Gradual rotation of the valve plate 41 from the neutral position will cause the land 57 to slowly isolate the ports 33, 35 so that each port is in communication only with the pressure region 61 or only with the discharge region 63. This condition is illustrated in FIG. 7. Where port 35 is in communication with only the pressure region 61 and port 33 with the discharge region 63. Of course, the particular work port 33, 35 which is connected to the pressure region 61 and to the discharge region 63 is a function of the direction in which the valve plate 41 is rotated.

Referring next to FIGS. 4, 6 and 9-14, the valve stem 19 has an elongate, generally cylindrical body 79 terminated at one end by a retaining flange 81 and at the other end by the drive shaft 21. An operating handle (not shown) may be attached to this shaft 21 for operating the valve 10. An 0-ring seal groove 83 is formed in the body 79 adjacent the shaft 21 and receives a 0-ring which prevents fluid from leaking to the exterior of the body 11.

Referring to FIGS. 4, 5, 10, 11, 13 and 14, an axial passage 77 is formed in the body 79 to a depth so that over a portion of its length, the stem 19 is hollow. The body 79 has at least one and preferably two metering orifices 85 and at least one and preferably two sensor apertures 87 radially formed therein. The metering orifices 85 (or at least one of them) provide fluid communication between the inlet conductor 37 and the passage 77 from the neutral position through an angle of rotation of about 45 degrees. These orifices 85 have a total cross sectional area which is significantly less than that of either of the apertures 87.

Several regularly spaced radial holes 89 are formed in the body 79 and irrespective of the rotational position of the stem 19, permit that pressure prevailing in the passage 77 (and in the pressure region 61) to be communicated to the balance area 75 at the opposed face 55 of the valve plate 41. These holes 89 are in parallel with the holes 69 in the valve plate 41 and help to reduce internal pressure drop, thereby resulting in a more accurately predictable unbalance of the valve plate 41.

A transverse hole 91 is formed through the body 79 at a location near the retaining flange 81. The location of this hole 91 is selected such that a pin 93 placed in it will engage a pin recess (not shown) in the valve plate 41. When the stem 19 and the valve plate 41 are coupled together in this manner, rotation of the stem 19 will cause coincident rotation of the valve plate 41.

Figure 6:
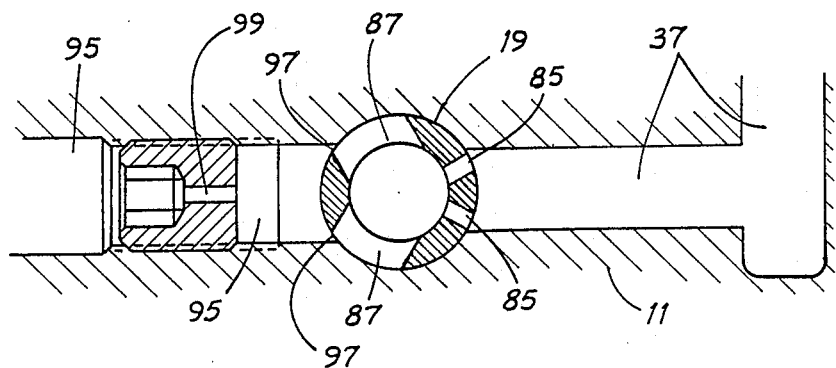
FIG. 6 is a partial cross-sectional elevation view of a portion of the rotary valve taken along the plane 6—6 of FIG. 4.

Referring to FIGS. 3 and 6, a sensor conductor 95 is also formed in the body 11 to provide a pressure signal to one side of a flow controlling mechanism 43. The conductor 95 is arranged to be in fluid communication with the axial passage 77 of the valve stem 19. With the stem 19 in the neutral position as shown in FIG. 6, communication between the conductor 95 and the passage 77 is by small orifice slots 97 defined by the intersection of the body 11 defining the conductor side walls and the apertures 87. However, as the stem 19 is rotated from neutral, clockwise or counterclockwise, one of the apertures 87 will come to be essentially aligned with the conductor 95 for unrestricted communication. A damping orifice 99 may be used in the conductor 95 to "soften" the operation of the flow controlling mechanism 43 in the event the stem 19 is rotated rapidly from neutral toward an extreme position. As is described in greater detail below, the sensing conductor 95 is also in fluid communication with an optional two position valve 47.

As shown in FIGS. 3 and 4, a flow controlling mechanism 43 is received within a first cross passage 101 formed in the body 11 to be in fluid communication with the inlet conductor 37 and the sensing conductor 95. The cross passage 101 is generally cylindrical in shape and has a diameter selected to receive the differential flow controlling mechanism 43. Preferably, this mechanism 43 is embodied as a differential pressure spool 103 which is spring biased to the left as viewed in FIG. 3. This cross passage 101 also intersects with the discharge conductor 39 in such way that when the spool 103 is biased to the right by the action of a suitable differential pressure thereacross, fluid can flow from the inlet conductor 37 through the passage 101 and out the discharge conductor 39. It is to be appreciated that this flow controlling mechanism 43 forms a metering function rather than merely being positionable between and open and closed positions. Once differential cracking pressure is achieved across the spool 103, progressive increases in differential pressure will cause the spool land to define a flow path of progressively increasing area.

A second cross passage 105 is also formed in the body 11 and is sized and located to intersect with the inlet conductor 37, the discharge conductor 39 and the sensing conductor 95. In a highly preferred embodiment, a relief valve 47 is mounted in the passage 105 in a manner to permit fluid to flow from the inlet conductor 37 to the discharge conductor 39 whenever the pressure setting of the relief valve 47 is exceeded.

In the illustrated embodiment, the relief valve 47 has a tubular body 107 with at least one vent passage 109a and preferably a second vent passage 109b therethrough. If the relief valve 47 is activated, at least the vent passage 109a will permit fluid to flow to the discharge conductor.

In the illustrated embodiment, a conventional plug 111 is installed in series with the sensing conductor 95 and the second passage 105. This plug 111 maintains the tubular body 107 in position and provides a platform against which the relief valve spring bears. In this configuration, the sensing conductor 95 is isolated from the discharge conductor 3.

Referring additionally to FIG. 8, this plug 111 may be replaced by a two position electrically actuated solenoid unloading valve 113. In a first energized position, this valve 113 opens a passage (not shown) and thereby causes the sensing conductor 95 to be in fluid communication with the interior of the tubular body 107. With the selector valve 113 in such position, any pressurized fluid in the sensing conductor 95 and downstream of orifice 99 is vented to the discharge conductor 39 through the passage 105 at low pressure. As described in greater detail below, enerization of the solenoid valve 113 to vent the sensing conductor 95 will cause flow to bypass the hydraulic motor without the necessity of returning the rotary valve to the neutral position It is to be understood from the foregoing that other applications may be more beneficially met by having a solenoid valve 113 which is normally open and which is closed when energized.

Figure 15:
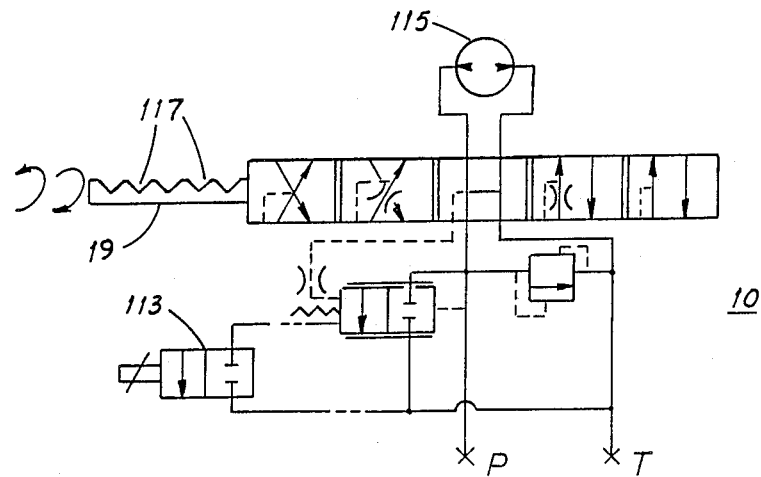
FIG. 15 is a symbolic drawing of the rotary valve circuit shown to include an optional solenoid unloading valve and also shown to include a hydraulic motor connected to the valve; and, FIG. 16 is a symbolic diagram of the rotary valve circuit showing the changes in directional and flow control characteristics which occur as the valve stem is rotated from neutral to an extreme position of travel in either direction.
Figure 16:
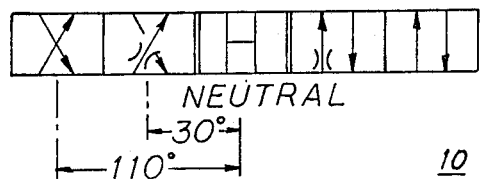

FIG. 15 uses standard hydraulic symbols and schematically represents the rotary valve 10 including the optional solenoid selector valve 113 and the hydraulic motor 115 which is attached to the valve 10. It is to be appreciated that rotary movement of the valve stem 19 is represented as linear motion in such symbolic diagrams. The valve 10 preferably includes either a spring centering assembly or detents 117, one each at the neutral position and at each position which is 30° and 110° either side of neutral. While detents 117 have not been described, they could be of any known construction and will aid in retaining a handle in a pre-determined position. FIG. 16 symbolically illustrates how the valve 10 achieves controlled or full flow, depending upon the rotational position of the stem 19 and valve plate 41 from a neutral position.

In operation, it is assumed that the inlet port 25 of the rotary valve 10 is connected to a fixed delivery pump (not shown) and that the discharge port 27 is connected to a reservoir (not shown). Further assuming the pump is driven at a constant speed, a substantially constant flow rate of fluid, e.g., 5 gpm, will be delivered to the valve 10. With the stem 19 and valve plate 41 in neutral, fluid will flow through the inlet conductor 37 to the orifices 85 the valve stem 19. Since these orifices 85 have relatively small cross sectional area, a significant back pressure in the inlet conductor 37 will result.

The orifice areas, pump flow rate and actuating differential pressure of the flow controlling mechanism 43 are preferably selected in coordination so that the resulting back pressure is sufficient to fully open the differential pressure spool 103. Most fluid will flow from the inlet conductor 37 across the spool 103 and out the discharge conductor 39, thereby bypassing the valve plate 41 and the motor work ports 33, 35. However, some fluid will flow through the orifices 85, down the stem passage 77 and into the pressure region 61. Since the land 57 is then positioned to interconnect the work ports 33, 35 with both the pressure region 61 and the discharge region 63, this fluid will continue to flow to the discharge conductor 39 at very low pressure.

Since this low pressure is essentially that pressure which prevails in the stem passage 77 and since the sensing conductor 95 is in fluid communication with this passage 77, the back pressure applied to the reverse side of the spool 103 will be low and the bypassing of fluid by the flow controlling mechanism 43 will not thereby be impaired.

As the stem 19 and valve plate 41 are rotated from neutral toward a working position, the land 57 isolates the work ports 33, 35 so that one of them communicates only with the pressure region 61 and the other only with the discharge region 63. With about 12 degrees rotation in the illustrated embodiment, one orifice 85 becomes partially closed. Over this initial range of valve operation, the spool 103 maintains a substantially constant differential pressure across the orifices 85 and therefore causes a substantially constant flow of fluid to the motor 115, irrespective of motor loading.

If the stem 19 and valve plate 41 are further rotated to a position about 30 degrees from neutral, one orifice 85 becomes completely closed and the motor 115 will run at low speed. In a power mower application, this is known as the "back lap" position whereby the mower is driven slowly. Further advances in the position of the valve plate 41 and stem 19 will cause one of the apertures 87 to come to essential alignment with the inlet conductor 31. Back pressure in the inlet conductor 37 diminishes and the motor 115 runs at progressively increased speeds until, in the illustrated embodiment, maximum speed is reached at about 110 degrees rotation. From the foregoing, it is to be appreciated that the magnitude of rotation of the valve stem 19 necessary to go from full speed in one direction to the "back lap" position in the other direction is about 140 degrees.

It is to be understood that the relief valve 47 and the flow controlling mechanism 43 need not be integrated into the valve body 11 although such construction will significantly reduce installation costs Instead, the valve 47 and the mechanism 43 could be separately mounted and plumbed if they are required in a particular circuit.

It is also to be understood that the rotary valve 10 could be constructed to be used in a circuit where, for example, two rotary valves 10 and associated motors 115 are connected in series. To do so, the body 11 would be constructed to have a separate tank passage for the relief valve 47 and solenoid valve 113. The discharge port 27 would then be connected to the next downstream device.

It is also to be understood that the rotary valve 10 could be constructed for use in a closed center hydraulic system, i.e., one equipped with a pressure compensated, variable delivery pump which reduces its output flow to near zero when its output port is closed. To arrange the valve 10 for such operation, passageways 85 in stem 19 are relocated so that the stem 19 prevents fluid communication from passage 37 to passage 77 until the valve plate 41 is rotated to connect one of the work ports 33 or 35 to the pressure region 61 and the other work port 35 or 33 to the discharge region 63. The sensor conductor 95 and flow controlling mechanism 43 may be omitted.

It is also to be understood that the rotary valve 10 could be constructed in other ways. As another example, the flow controlling mechanism 43 and its passage 101 may be omitted while yet retaining the sensor conductor 95. Intermediate construction plug 23 (FIG. 1) is removed to provide a pressure pickup connection from the conductor 95 to a load sensing pump. Such a pump includes an integral flow controlling mechanism such as mechanism 43. When the valve 10 is used with either a pressure compensated pump or a load sensing pump, the relief valve 47 may be integrated into the valve 10 as shown in FIGS. 3 and 7 or omitted from the valve 10 and installed as a separate component.

Further, the rotary valve 10 need not be used as an integral part of a motor 115. The valving block 13 could be replaced by a manifold block of known type having output ports connectable to virtually any type of bidirectional hydraulic device such as a cylinder.

While the principles of this invention have been described in connection with specific embodiments, it should be understood clearly that these descriptions are made only by way of example and are not intended to limit the scope of the invention.

I claim:

1. A rotary valve including:
   a valving block having a valve interface with a first work port and a second work port formed in the interface for flowing fluid between the rotary valve and the block;
   a valve body attached to the block and having an inlet conductor for connection to a source of fluid and a discharge conductor for connection to a downstream device;
   a rotatable valve plate received in the body and having a working face and an opposed face, the working face including a continuous land in contact with the valve interface, the land being configured to segregate the cavity adjacent the working face into a pressure region and a discharge region;
   a rotatable stem received in the body and coupled to the valve plate for causing rotational movement thereof, the stem having an axial passage in fluid communication with the pressure region and having at least one aperture for intersecting the inlet conductor and controllably metering fluid from the inlet conductor into the pressure region;
   each of the work ports being in fluid communication with the pressure region and the discharge region when the valve plate is in the neutral position, the stem and the plate being rotatable to an operating position wherein one of the work ports is in fluid communication with only the pressure region and the other of the work ports is in fluid communication with only the discharge region;
   a flow controlling mechanism in operative relationship to the body for limiting, over a range of operating positions, the flow of fluid from the inlet conductor to a work port;
   the rotary valve thereby being arranged for controlling the speed of a hydraulic device attached to the valving block.

2. The rotary valve of claim 1 wherein that pressure prevailing in the pressure region of the working face is communicated to a portion of the opposed face, the net resulting force acting on the valve plate being such that the valve plate is urged toward the valving block.

3. The rotary valve of claim 2 wherein that pressure prevailing in the pressure region of the working face is communicated to a portion of the opposed face by at least one aperture formed in the valve plate.

4. The rotary valve of claim 1 wherein the stem has an axis of rotation and wherein fluid under pressure is communicated from the inlet conductor to the pressure region by a feed channel which includes the axis of rotation.

5. A rotary valve including:
   a valving block having a valve interface with a first work port and a second work port formed in the interface for flowing fluid between the rotary valve and the block;
   a valve body attached to the block and having an inlet conductor for connection to a source of fluid and a discharge conductor for connection to a reservoir;
   a rotatable valve plate received in the body and having a working face and an opposed face, the working face including a land in contact with the valve interface and configured to segregate the cavity between the valve interface and the working face into a pressure region and a discharge region;
   a rotatable stem received in the body and coupled to the valve plate for causing rotational movement thereof, the stem having an axial passage in fluid communication with the pressure region and having at least one metering aperture for intersecting the inlet conductor and controllably flowing fluid from the inlet conductor into the pressure region;
   each of the work ports being in fluid communication with the pressure region and the discharge region when the valve plate is in the neutral position, the plate being rotatable to an operating position wherein one of the work ports is in fluid communication with only the pressure region and the other of the work ports is in fluid communication with only the discharge region;
   a sensing conductor formed in the body to be in fluid communication with the pressure region;
   a flow controlling mechanism received in the body and connected in pressure sensing relationship to the inlet conductor and to the sensing conductor for limiting, over a range of operating positions, the flow of fluid from the inlet conductor to a work port;
   the rotary valve thereby being arranged for controlling the speed of a hydraulic device attached to the valving block.

6. The rotary valve of claim 5 wherein rotational movement of the valve plate results in movement of the hydraulic device in a direction and at a speed and wherein for at least some positions of the valve plate, the speed of movement of the device is controlled in part by the flow controlling mechanism.

7. The rotary valve of claim 6 further including a pressure relief valve received in the body and arranged to permit fluid to flow from the inlet conductor to the discharge conductor if the pressure in the inlet conductor exceeds a predetermined value.

8. The rotary valve of claim 7 wherein the relief valve has a tubular body with a vent passage therethrough and wherein the rotary valve further includes a selector valve received in the body in series with the sensing conductor and the passage, fluid in the sensing conductor being permitted to flow at low pressure through the vent passage to the discharge conductor when the selector valve is in a first position.

9. The rotary valve of claim 8 wherein the selector valve is of the solenoid type and wherein placement of the selector valve in the first position de-energizes the hydraulic device attached to the valving block without the necessity of manipulating the position of the valving plate.

10. The rotary valve of claim 6 further including an exhaust passage formed in the body to be in flow isolation from the discharge conductor and further including a pressure relief valve received in the body and arranged to permit fluid to flow from the inlet conductor to the exhaust passage if the pressure in the inlet conductor exceeds a predetermined value, the rotary valve thereby being made suitable for connection in series to a second hydraulic device.

11. The rotary valve of claim 10 wherein the relief valve has a tubular body with a vent passage therethrough and wherein the rotary valve further includes a selector valve received in the body in series with the sensing conductor and the exhaust passage, fluid in the sensing conductor being permitted to flow at low pressure through the vent passage to the exhaust passage when the selector valve is in a first position.

12. A rotary valve including:
   a valving block having a valve interface with a first work port and a second work port formed in the interface for flowing fluid between the rotary valve and the block;
   a valve body attached to the block and having an inlet conductor for connection to a source of fluid and a discharge conductor for connection to a reservoir;
   a rotatable valve plate received in the body and having a working face and an opposed face, the working face including a land in contact with the valve interface and configured to segregate the cavity between the valve interface and the working face into a pressure region and a discharge region;
   a rotatable stem received in the body and coupled to the valve plate for causing rotational movement thereof, the stem having an axial passage in fluid communication with the pressure region and having at least one metering aperture for intersecting the inlet conductor and controllably flowing fluid from the inlet conductor into the pressure region;
   each of the work ports being in fluid communication with the pressure region and the discharge region when the valve plate is in the neutral position, the plate being rotatable to an operating position wherein one of the work ports is in fluid communication with only the pressure region and the other of the work ports is in fluid communication with only the discharge region;
   the rotary valve thereby being configured to direct fluid from a hydraulic pump to a hydraulic motor for bidirectional control of the motor.

13. The rotary valve of claim 12 wherein the metering aperture is arranged in the stem to intersect the inlet conductor only after the plate is rotated to position one of the work ports in fluid communication with only the pressure region and the other of the work ports in fluid communication with only the discharge region, the rotary valve thereby being configured for use with a pressure compensated variable delivery pump.

14. The rotary valve of claim 13 further including a relief valve integrated to the valve body.

15. The rotary valve of claim 12 further including a sensing conductor formed in the body to be in fluid communication with the pressure region, the body including a pressure pickup connection for providing a pressure signal from the sensing conductor, the rotary valve thereby being configured to be used with a load sensing pump.

16. The rotary valve of claim 15 further including a relief valve integrated to the valve body.

* * * * *